Nov. 9, 1926. 1,606,068
A. FIRTH
BUCKET, CAGE, OR SIMILAR RECEPTACLE FOR USE IN PRESERVING EGGS
Filed Feb. 11, 1925
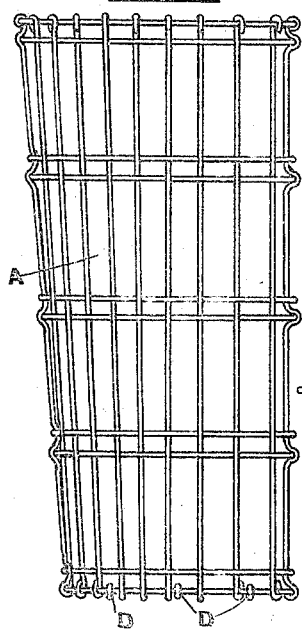
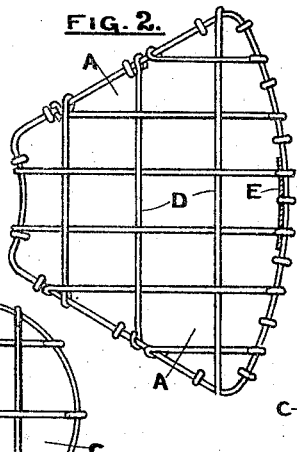
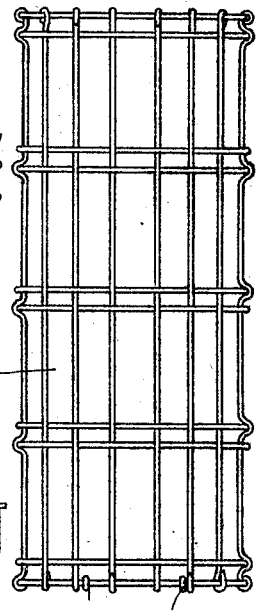
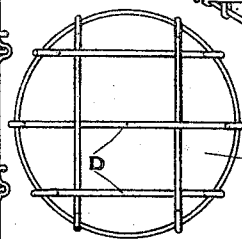
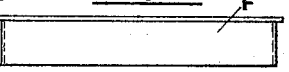
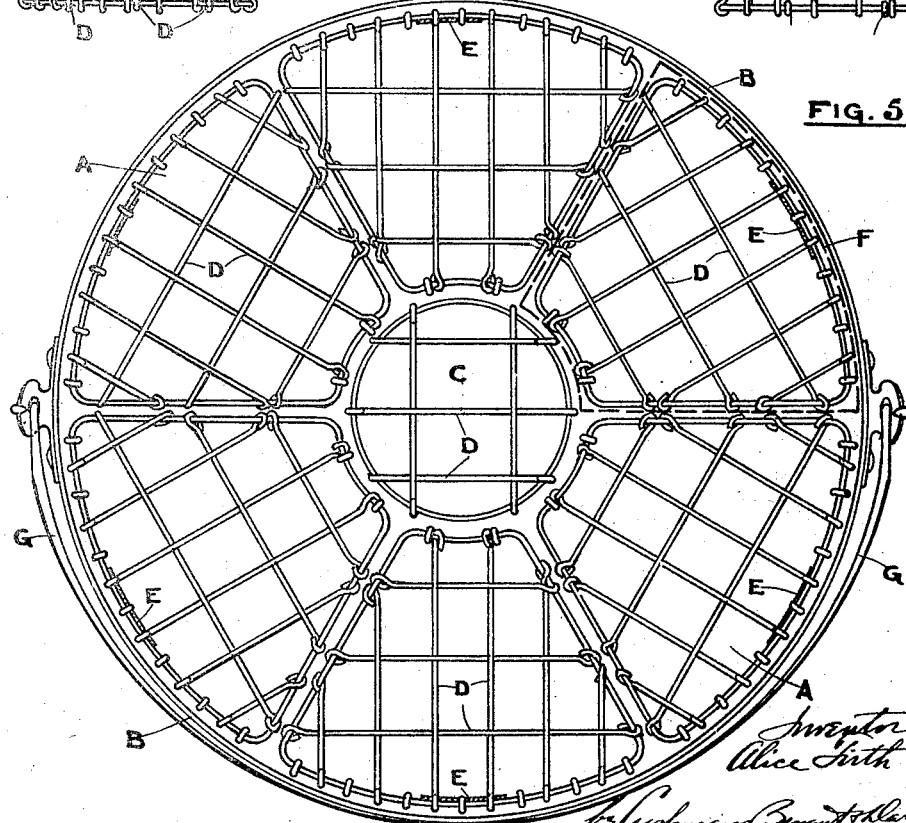

Patented Nov. 9, 1926.

1,606,068

UNITED STATES PATENT OFFICE.

ALICE FIRTH, OF HALIFAX, ENGLAND.

BUCKET, CAGE, OR SIMILAR RECEPTACLE FOR USE IN PRESERVING EGGS.

Application filed February 11, 1925, Serial No. 8,438, and in Great Britain February 13, 1924.

This invention relates to receptacles for storing eggs when submerged in water-glass or the like to preserve their freshness.

Hitherto, eggs which it is desired to preserve, are placed within a single wire cage or a number of superimposed cages adapted to fit within a correspondingly shaped bucket or container containing a solution of waterglass or the like preservative within which the eggs are to be preserved. It is not always possible to immediately obtain a sufficient supply of eggs to fill the aforesaid cage when desiring to preserve them for future use, consequently additional supplies are added from time to time until the desired amount is obtained with the result that the eggs forming a part of the whole of the last supply put into pickle are generally the first to be taken out for use or consumption, and vice-versa, therefore it will be obvious that upon approaching the end of supplies the eggs at or near the bottom of the cage are usually found to be suffering from age.

The object of my invention is to reduce to a minimum the evil attending such a contingency by dispensing with the single wire cage, and employ a number of separate small cages, pockets or sections side by side, in such a manner that the sections, which are preferably numbered or labelled, may be separately taken out of the bucket and emptied of their contents in the order in which they are filled, so that in normal circumstances the section first to be filled may be the first to be emptied, and so confer approximate uniformity in the period of preservation throughout the whole of the eggs originally placed in the bucket.

According to my invention I employ within the customary bucket a number of segmental cages or pockets preferably constructed of wire of a suitable gauge and mesh, or they may be made of perforated sheet metal, the holding capacity depending upon the number of eggs required to be stored therein or upon the size of the bucket; the cages or sections being shaped so as to be adapted to fit side by side within said bucket and preferably so as to admit of a further cage of cylindrical shape in the centre or co-axial with the surrounding cages, with sufficient space between the sections to permit of each being freely and separately taken out of or replaced within the bucket.

Each section is provided with a consecutive number, label or the like near the upper edge whereby the rotation of the filling or the emptying thereof may be indicated and noted, as desired.

Any suitable number of cages, sections, or pockets of any suitable shape may be employed, and each may be lifted out of the bucket or replaced therein separately for removing or adding to the supply of eggs.

Also in conjunction with the above, I may employ a suitable flanged lid or cover adapted to fit upon one of the triangular shaped cages, preferably upon the one next to be emptied or from which the eggs are next to be taken, and upon removal of this lid it may be inverted and the said cage placed therein to drain during the time it is out of the bucket.

If desired the cages or pockets may have hinged or locked lids or covers which also may be numbered or labelled.

I attain these objects by the means illustrated in the accompanying drawing, in which :—

Fig. 1 is an elevation of one of the side cages or pockets; Fig. 2 is a plan of Fig 1; Fig. 3 is an elevation of the centre cage or pocket; Fig. 4 is a plan of Fig. 3; Fig. 5 is a plan of the customary bucket containing the preservative, showing an example of the arrangement of a number of cages, pockets or sections according to my invention, with the loose lid or cover in broken lines fitting upon one of the sections, and Fig. 6 is an elevation of such lid or cover.

Referring to the drawing, A, A, are a number of triangular cages or pockets constructed of wire, adapted to fit within the customary bucket or the like receptacle B containing a preservative, and of a depth corresponding therewith. C is the central pocket, and D are the interlaced wires forming the bottom of each pocket, E are numbered plates secured to the outer rim of each pocket, and F is the loose lid or cover of one of these pockets adapted to serve as a drainer therefor when inverted during the removal of the eggs in the basket contained therein. G is the ordinary bucket handle secured to the bucket B in the well known manner.

What I claim as my invention, and desire to secure by Letters Patent, is:—

1. In a device of the character described, a container for receiving a preserving fluid, and a plurality of article receptacles disposed therein, said receptacles being foraminous whereby the preserving fluid may freely circulate therethrough.

2. In a device of the character described, a container for receiving a preserving fluid, and a plurality of coaxially disposed article receptacles loosely mounted in said container, said receptacles being foraminous whereby the preserving fluid may freely circulate therethrough.

3. In a device of the character described, a container for receiving a preserving fluid, a plurality of trapezoidal shaped open work article receptacles adapted to be immersed in the preserving fluid in said container.

4. In a device of the character described, a container for receiving a preserving fluid, a plurality of coaxially disposed receptacles loosely mounted in said first mentioned container, and a receptacle disposed centrally of said first mentioned container, said receptacles being foraminous whereby the preserving fluid may pass freely therethrough.

5. In a device of the character described, a container for receiving a preserving fluid, a plurality of openwork containers removably disposed in said first mentioned container, and a drainage cover adapted for selective application to each of said openwork containers, whereby when the containers are removed, said cover will act to receive any excess preserving fluid draining from the openwork containers.

In testimony whereof I have signed my name to this specification.

ALICE FIRTH.